(12) United States Patent
Shirao et al.

(10) Patent No.: US 8,386,136 B2
(45) Date of Patent: Feb. 26, 2013

(54) CONSTRUCTION VEHICLE

(75) Inventors: Atsushi Shirao, Komatsu (JP); Masanori Ikari, Komatsu (JP)

(73) Assignee: Komatsu Ltd., Tokyo (JP)

( * ) Notice: Subject to any disclaimer, the term of this patent is extended or adjusted under 35 U.S.C. 154(b) by 729 days.

(21) Appl. No.: 12/527,825

(22) PCT Filed: Feb. 21, 2008

(86) PCT No.: PCT/JP2008/052931
§ 371 (c)(1),
(2), (4) Date: Aug. 19, 2009

(87) PCT Pub. No.: WO2008/136204
PCT Pub. Date: Nov. 13, 2008

(65) Prior Publication Data
US 2010/0094515 A1 Apr. 15, 2010

(30) Foreign Application Priority Data
Apr. 26, 2007 (JP) ................................ 2007-116722

(51) Int. Cl.
*G06F 7/70* (2006.01)
(52) U.S. Cl. ...................................................... 701/50
(58) Field of Classification Search ............ 701/50; 60/452
See application file for complete search history.

(56) References Cited

U.S. PATENT DOCUMENTS

| | | | | |
|---|---|---|---|---|
| 5,121,603 A * | 6/1992 | Widemann | ....................... | 60/447 |
| 5,203,168 A * | 4/1993 | Oshina et al. | ....................... | 60/426 |
| 5,299,421 A | 4/1994 | Ikari | | |
| 5,421,155 A * | 6/1995 | Hirata et al. | ....................... | 60/426 |
| 5,561,979 A * | 10/1996 | Coutant et al. | ....................... | 60/448 |
| 5,784,883 A * | 7/1998 | Ohkura et al. | ....................... | 60/327 |
| 5,865,602 A * | 2/1999 | Nozari | ....................... | 417/44.1 |
| 6,220,028 B1 * | 4/2001 | Ishikawa et al. | ....................... | 60/431 |
| 7,415,822 B1 * | 8/2008 | Harber et al. | ....................... | 60/452 |
| 7,549,287 B2 * | 6/2009 | Foster et al. | ....................... | 60/445 |
| 7,584,611 B2 * | 9/2009 | Ariga et al. | ....................... | 60/431 |
| 7,987,941 B2 * | 8/2011 | Shirao et al. | ....................... | 180/307 |
| 8,301,346 B2 * | 10/2012 | Lee | ....................... | 701/50 |
| 2004/0211614 A1 | 10/2004 | Matsuyama | | |

FOREIGN PATENT DOCUMENTS

| | | |
|---|---|---|
| EP | 1 319 763 A1 | 6/2003 |
| JP | 03-14966 A | 1/1991 |
| JP | 2004-144254 A | 5/2004 |

OTHER PUBLICATIONS

Office Action of corresponding Swedish Application No. 0950589-2 dated Apr. 29, 2010.

* cited by examiner

*Primary Examiner* — Thomas B Will
*Assistant Examiner* — Joel F. Mitchell
(74) *Attorney, Agent, or Firm* — Global IP Counselors

(57) ABSTRACT

In the construction vehicle, a controller is configured to implement a pump displacement rapid change suppression control for controlling the displacement of a travel hydraulic pump so that travel circuit oil pressure reaches a maximum value equal to or less than a cutoff pressure value when the vehicle has stopped regardless of engine speed, and the displacement of the travel hydraulic pump gradually increases as the travel circuit oil pressure decreases from the maximum value.

14 Claims, 14 Drawing Sheets

1

CONSTRUCTION VEHICLE

CROSS-REFERENCE TO RELATED APPLICATIONS

This national phase application claims priority to Japanese Patent Application No. 2007-116722, filed on Apr. 26, 2007. The entire disclosure of Japanese Patent Application No. 2007-116722 is hereby incorporated herein by reference.

TECHNICAL FIELD

The present invention relates to a construction vehicle.

BACKGROUND ART

An example of a construction vehicle is one wherein a hydraulic pump is driven by an engine, and a travel hydraulic motor is driven by pressure oil discharged from the hydraulic pump, thereby causing the vehicle to travel. With this type of construction vehicle, the speed and traction force of the vehicle can be controlled by controlling the engine speed, the displacement of the hydraulic pump, and the displacement of the travel hydraulic motor (Japanese Laid-Open Patent Application No. 2004-144254).

Pump displacement-primary circuit oil pressure characteristics such as those shown in FIG. 14 are commonly obtained in a construction vehicle such as the one described above. The solid line L11 and the dashed lines L12 to L15 in this diagram are lines showing the pump displacement-primary circuit oil pressure characteristics, which vary according to the engine speed. The primary circuit oil pressure is the oil pressure in a travel hydraulic circuit through which flows pressure oil discharged from the hydraulic pump and sent to the travel hydraulic motor. The dashed line L14 shows that the pump displacement is reduced when the primary circuit oil pressure increases, and the pump displacement is increased when the primary circuit oil pressure decreases. The construction vehicle is also provided with an oil pressure limiting component in order to protect the travel hydraulic circuit. The oil pressure limiting component is configured from a cutoff valve or another component for reducing the primary circuit oil pressure so that the primary circuit oil pressure does not exceed a predetermined cutoff pressure value. In the pump displacement-primary circuit oil pressure characteristics shown by the dashed line L12 in FIG. 14, the cutoff valve operates in cases in which the pump displacement is equal to or less than a predetermined pump displacement value Qx3, causing the primary circuit oil pressure to decrease and remain constant at a cutoff pressure value Plt.

DISCLOSURE OF THE INVENTION

However, in a construction vehicle such as the one described above, the pump displacement changes rapidly, and tires may slip or the vehicle may suddenly accelerate. For example, there may be instances in which the construction vehicle remains stopped, being unable to move forward, because of a large load when the vehicle is pushing snow or sediment. In this state, assuming the operator keeps the acceleration pedal fully depressed, the engine speed will therefore maintain its maximum rotational speed. In this case, since the primary circuit oil pressure has increased, the oil pressure limiting component operates so as to reduce the primary circuit oil pressure. At this time, the pump displacement and the primary circuit oil pressure reach the point Px1 in FIG. 14. In this state, the primary circuit oil pressure decreases when the load borne by the construction vehicle from the snow or sediment is lightened. With the pump displacement-primary circuit oil pressure characteristics such as those shown by the solid line L11, the pump displacement and primary circuit oil pressure then change from the point Px1 to the point Px2, and the pump displacement therefore rapidly changes from Qx1 to Qx2. Therefore, the tires may slip or the construction vehicle may suddenly accelerate.

An object of the present invention is to provide a construction vehicle in which it is possible to minimize tire slippage and sudden acceleration.

The construction vehicle according to a first aspect of the present invention comprises an engine, a travel hydraulic pump, a travel hydraulic circuit, a travel hydraulic motor, a travel wheel, a work equipment hydraulic pump, a work equipment, a controller, and an oil pressure limiting component. The travel hydraulic pump is a hydraulic pump driven by the engine. The travel hydraulic circuit is a circuit through which pressure oil discharged from the travel hydraulic pump flows. The travel hydraulic motor is a hydraulic motor driven by pressure oil supplied through the travel hydraulic circuit. The travel wheel is driven by drive force of the travel hydraulic motor. The work equipment hydraulic pump is a hydraulic pump driven by the engine. The work equipment is driven by pressure oil discharged from the work equipment hydraulic pump. The controller is configured to control the engine speed, the displacement of the travel hydraulic pump, and the displacement of the travel hydraulic motor so as to control the vehicle speed and traction force. The oil pressure limiting component is configured to limit travel circuit pressure so as not to exceed a predetermined cutoff pressure value, the travel circuit pressure being the pressure of pressure oil flowing through the travel hydraulic circuit. The controller is configured to implement a pump displacement rapid change suppression control for controlling the displacement of the travel hydraulic pump so that the travel circuit pressure reaches a maximum value equal to or less than the cutoff pressure value when the vehicle has stopped regardless of the engine speed, and the displacement of the travel hydraulic pump gradually increases as the travel circuit pressure decreases from the maximum value.

In this construction vehicle, implementing pump displacement rapid change suppression control results in pump displacement-primary circuit oil pressure characteristics wherein the travel circuit pressure gradually changes in accordance with changes in the primary circuit oil pressure, without the operation of the oil pressure limiting component. With this construction vehicle, rapid changes in pump displacement can thereby be suppressed, and tire slippage and sudden acceleration can also be suppressed.

With this pump displacement rapid change suppression control, since the displacement of the travel hydraulic pump is controlled, the chance of affecting the discharge flow rate of other hydraulic pumps, i.e., the work equipment hydraulic pump is less than in cases in which the engine speed is limited. Therefore, decreases in the driven speed of the work equipment can be suppressed while the pump displacement rapid change suppression control is being implemented.

The construction vehicle according to a second aspect of the present invention comprises an engine, a travel hydraulic pump, a travel hydraulic circuit, a travel hydraulic motor, a travel wheel, a work equipment hydraulic pump, a work equipment, a controller, and an oil pressure limiting component. The travel hydraulic pump is a hydraulic pump driven by the engine. The travel hydraulic circuit is a circuit through which flows pressure oil discharged from the travel hydraulic pump. The travel hydraulic motor is a hydraulic motor driven by pressure oil supplied through the travel hydraulic circuit. The travel wheel is driven by drive force of the travel hydraulic motor. The work equipment hydraulic pump is a hydraulic pump driven by the engine. The work equipment is driven by pressure oil discharged from the work equipment hydraulic pump. The controller is configured to control the engine speed, the displacement of the travel hydraulic pump, and the displacement of the travel hydraulic motor so as to control the vehicle speed and traction force. The oil pressure limiting component is configured to limit travel circuit pressure so as not to exceed a predetermined cutoff pressure value, the travel circuit pressure being the pressure of pressure oil flowing through the travel hydraulic circuit. The controller is configured to implement pump displacement rapid change suppression control for controlling the displacement of the travel hydraulic pump so that the displacement of the travel hydraulic pump gradually decreases as the travel circuit pressure increases, and the travel circuit pressure reaches a maximum value equal to or less than the cutoff pressure value when the vehicle has stopped regardless of the engine speed.

In this construction vehicle, implementing pump displacement rapid change suppression control results in pump displacement-primary circuit oil pressure characteristics wherein the travel circuit pressure gradually changes in accordance with changes in the primary circuit oil pressure, without the operation of the oil pressure limiting component. With this construction vehicle, rapid changes in pump displacement can thereby be suppressed, and tire slippage and sudden acceleration can also be suppressed.

With this pump displacement rapid change suppression control, since the displacement of the travel hydraulic pump is controlled, the chance of affecting the discharge flow rate of other hydraulic pumps, i.e., the work equipment hydraulic pump is less than in cases in which the engine speed is limited. Therefore, decreases in the driven speed of the work equipment can be suppressed while the pump displacement rapid change suppression control is being implemented.

The construction vehicle according to a third aspect of the present invention is the construction vehicle according to the first or second aspect, further comprising a travel circuit pressure detector configured and arranged to detect the travel circuit pressure, and an engine speed detector configured and arranged to detect the engine speed. The controller is configured to control the displacement of the travel hydraulic pump during the pump displacement rapid change suppression control on the basis of the travel circuit pressure detected by the travel circuit pressure detector and the engine speed detected by the engine speed detector.

In this construction vehicle, the desired pump displacement-primary circuit oil pressure characteristics can be obtained by controlling the displacement of the travel hydraulic pump on the basis of the travel circuit pressure detected by the travel circuit pressure detector and the engine speed detected by the engine speed detector. The pump displacement rapid change suppression control described above can thereby be performed easily.

The construction vehicle according to a fourth aspect of the present invention is the construction vehicle according to the first or second aspect, further comprising a vehicle speed detector configured and arranged to detect vehicle speed, and an engine speed detector configured and arranged to detect the engine speed. The controller is configured to control the displacement of the travel hydraulic pump on the basis of the vehicle speed detected by the vehicle speed detector and the engine speed detected by the engine speed detector during the pump displacement rapid change suppression control.

In this construction vehicle, the displacement of the travel hydraulic pump is controlled based on the vehicle speed detected by the vehicle speed detector and the engine speed detected by the engine speed detector. In a vehicle having a mechanism whereby the displacement of the travel hydraulic pump decreases as the travel circuit pressure increases, the vehicle speed is a parameter correlated with the travel circuit pressure under the conditions that the displacement of the travel hydraulic motor is constant and the engine speed is constant. Therefore, the desired pump displacement-primary circuit oil pressure characteristics can be obtained also by controlling the displacement of the travel hydraulic pump on the basis of the vehicle speed and the engine speed. The pump displacement rapid change suppression control described above can thereby be performed easily.

The construction vehicle according to a fifth aspect of the present invention is the construction vehicle according to the first or second aspect, further comprising an electromagnetic proportional control valve configured and arranged to change the displacement of the travel hydraulic pump. The controller is configured to control the displacement of the travel hydraulic pump by electrically controlling the electromagnetic proportional control valve.

In this construction vehicle, the controller electrically controls the electromagnetic proportional control valve, and is thereby able to control the displacement of the travel hydraulic pump as required. Therefore, with this construction vehicle, the displacement of the travel hydraulic pump can be controlled so as to obtain the desired pump displacement-primary circuit oil pressure characteristics, and the pump displacement rapid change suppression control described above can thereby be easily performed.

The construction vehicle according to a sixth aspect of the present invention is the construction vehicle according to the first or second aspect, further comprising a pump displacement control mechanism configured and arranged to vary the displacement of the travel hydraulic pump in accordance with supplied pilot pressure, and a pressure control valve configured and arranged to change the pilot pressure supplied to the pump displacement control mechanism. The controller is configured to the displacement of the travel hydraulic pump by electrically controlling the pressure control valve.

In this construction vehicle, the controller electrically controls the pressure control valve, and is thereby able to control the displacement of the travel hydraulic pump as required. Therefore, with this construction vehicle, the displacement of the travel hydraulic pump can be controlled so as to obtain the desired pump displacement-primary circuit oil pressure characteristics, and the pump displacement rapid change suppression control described above can thereby be easily performed.

The construction vehicle according to a seventh aspect of the present invention is the construction vehicle according to the first or second aspect, wherein the controller is configured to control the displacement of the travel hydraulic pump during the pump displacement rapid change suppression control so that the maximum traction force in the vehicle speed-traction force characteristics occurs at a lower speed than the maximum traction force in the vehicle speed-traction force characteristics in cases in which the pump displacement rapid change suppression control is not performed.

In a conventional construction vehicle, the traction force peaks not when the vehicle speed is zero, but when the vehicle speed is in a low speed range, as in the vehicle speed-traction force characteristics shown in FIG. 15. In this case, the traction force increases according to an increase in vehicle speed at a certain speed or less, and the traction force then decreases according to an increase in vehicle speed at a certain speed or greater, which makes the vehicle harder for the operator to operate.

However, in the construction vehicle according to the seventh aspect of the present invention, during pump displacement rapid change suppression control, the maximum traction force in the vehicle speed-traction force characteristics occurs at a lower speed than the maximum traction force in the vehicle speed-traction force characteristics in cases in which pump displacement rapid change suppression control is not performed. Therefore, the vehicle speed-traction force characteristics during pump displacement rapid change suppression control are nearer to a monotonically decreasing function in which traction force gradually decreases according to the increase in vehicle speed, than are vehicle speed-traction force characteristics in cases in which pump displacement rapid change suppression control is not performed.

The construction vehicle according to an eighth aspect of the present invention is the construction vehicle according to the first or second aspect, further comprising a selector configured and arranged to allow an operator to select implementation of the pump displacement rapid change suppression control. In this construction vehicle, the operator can arbitrarily select whether or not the pump displacement rapid change suppression control is implemented by operating the selector. For example, the pump displacement rapid change suppression control can be selected when traveling over snowy roads or other low-friction road surfaces, and the pump displacement rapid change suppression control can be unselected when traveling over normal road surfaces.

DETAILED DESCRIPTION OF THE PREFERRED EMBODIMENTS

First Embodiment

Overall Configuration

Figure 1:
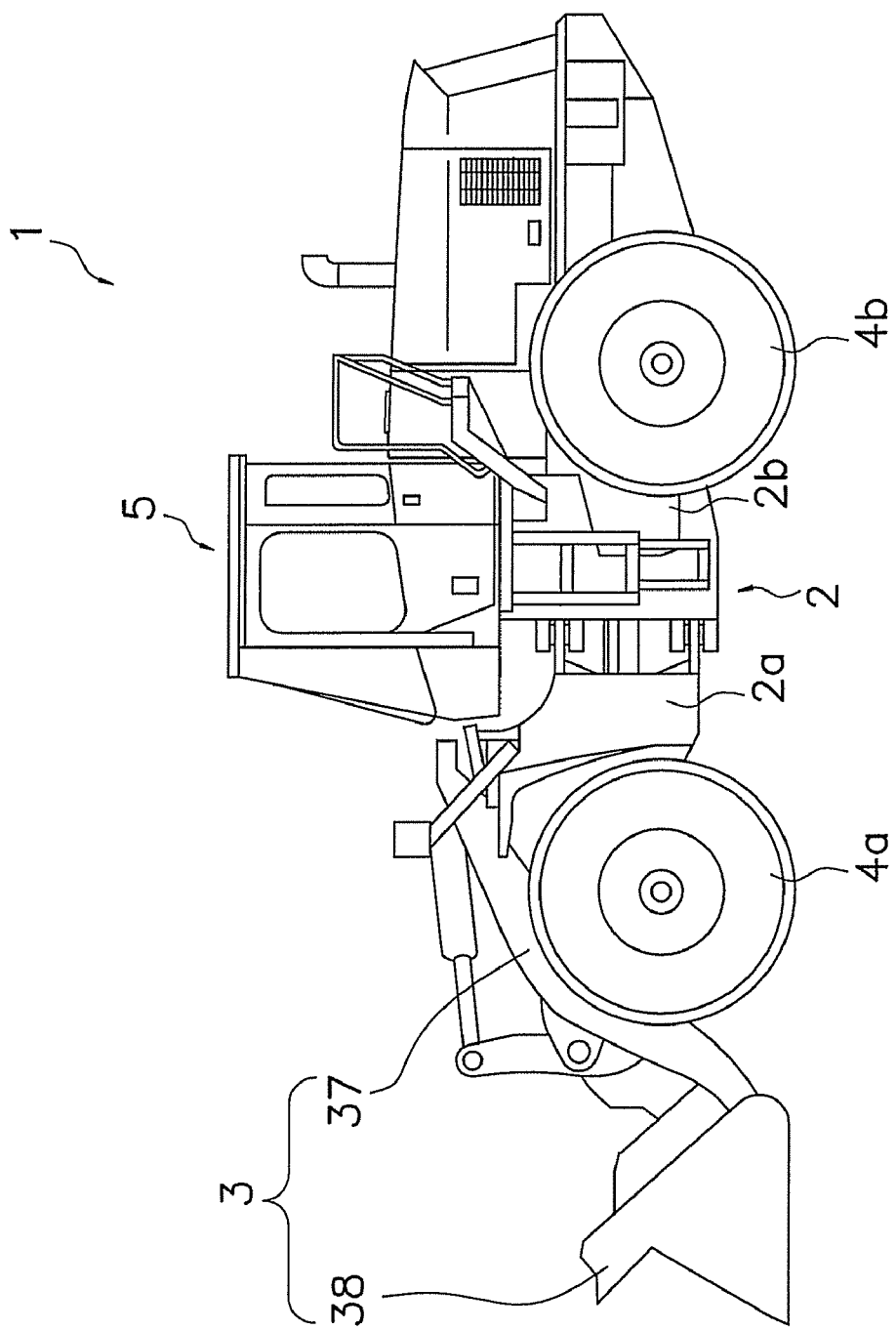
FIG. 1 is a side view of the construction vehicle.

A side view of the construction vehicle 1 according to one embodiment of the present invention is shown in FIG. 1. The construction vehicle 1 is a wheel loader capable of self-propulsion by means of tires 4a, 4b, and also capable of using a work equipment 3 to perform desired work. The construction vehicle 1 comprises a vehicle frame 2, a work equipment 3, tires 4a, 4b, and a cab 5.

The vehicle frame 2 has a front frame 2a disposed on the front side and a rear frame 2b disposed on the rear side, and the front frame 2a and rear frame 2b are coupled in the center of the vehicle frame 2 and are capable of swinging to the right and left.

Figure 2:
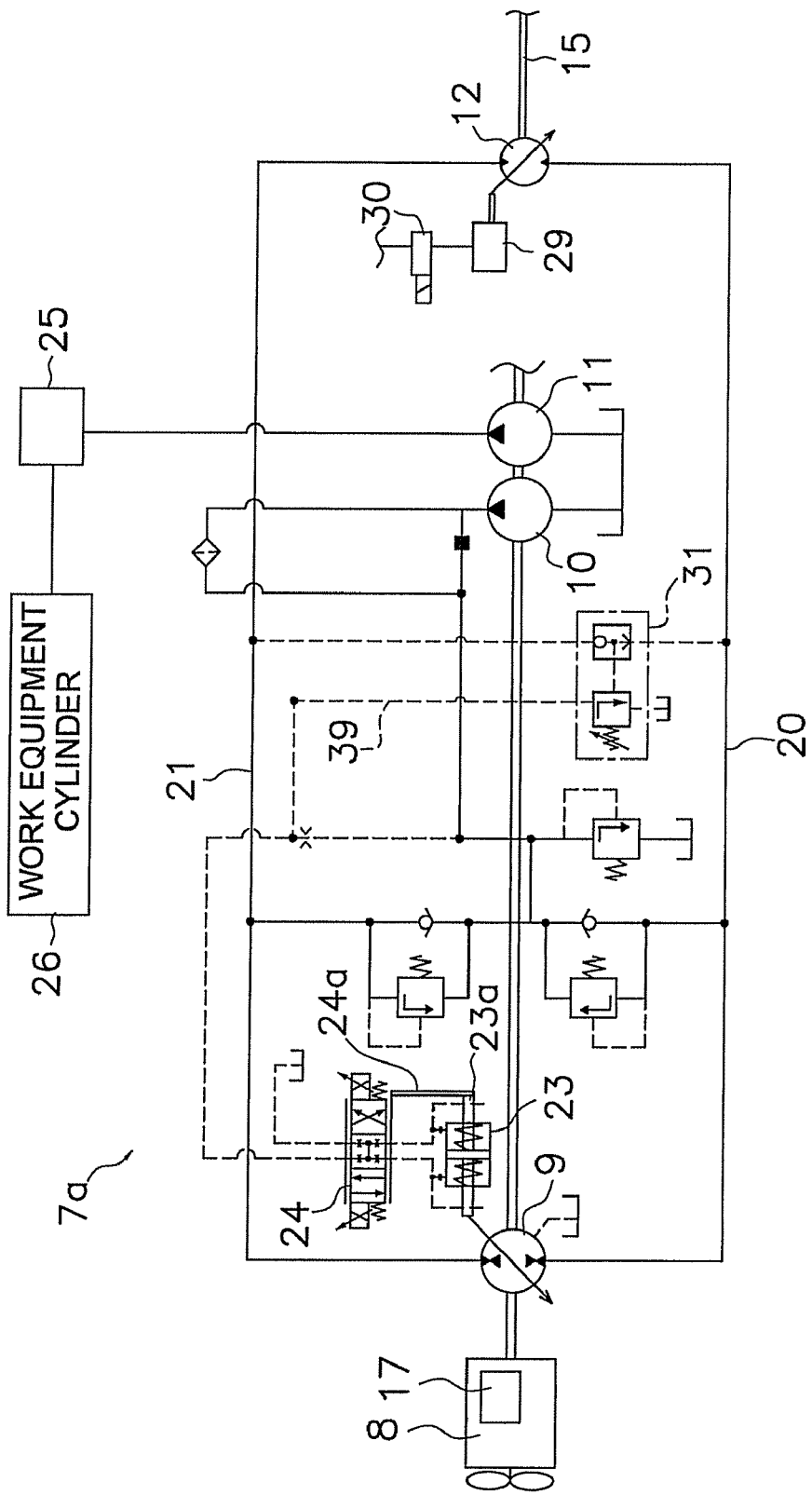
FIG. 2 is a schematic view showing the configuration of the hydraulic drive mechanism according to the first embodiment.

The work equipment 3 and a pair of front tires 4a are attached to the front frame 2a. The work equipment 3 is a device driven by pressure oil from a work equipment hydraulic pump 11 (see FIG. 2), and the work equipment has a lift arm 37 mounted to the front part of the front frame 2a, a bucket 38 attached to the distal ends of the lift arm 37, and a work equipment cylinder 26 (see FIG. 2) for driving these components. The pair of front tires 4a is provided to the side surfaces of the front frame 2a.

The cab 5, a pair of rear tires 4b, and other components are provided to the rear frame 2b. The cab 5 is placed at the top part of the vehicle frame 2, and inside the cab are installed a steering wheel, an acceleration pedal, and other operational components; a display unit for displaying the vehicle speed and other various information, an operator seat, and the like. The pair of rear tires 4b is provided on the side surfaces of the rear frame 2b. A hydraulic fluid tank (not shown) is disposed on the right side of the rear frame 2b, and the hydraulic fluid tank stores hydraulic fluid pressurized by various hydraulic pumps.

A hydraulic drive mechanism 7a for driving the tires 4a, 4b and the work equipment 3 is installed on the vehicle frame 2. The configuration of the hydraulic drive mechanism 7a is described hereinbelow with reference to FIG. 2.

Hydraulic Drive Mechanism 7a

Figure 3:
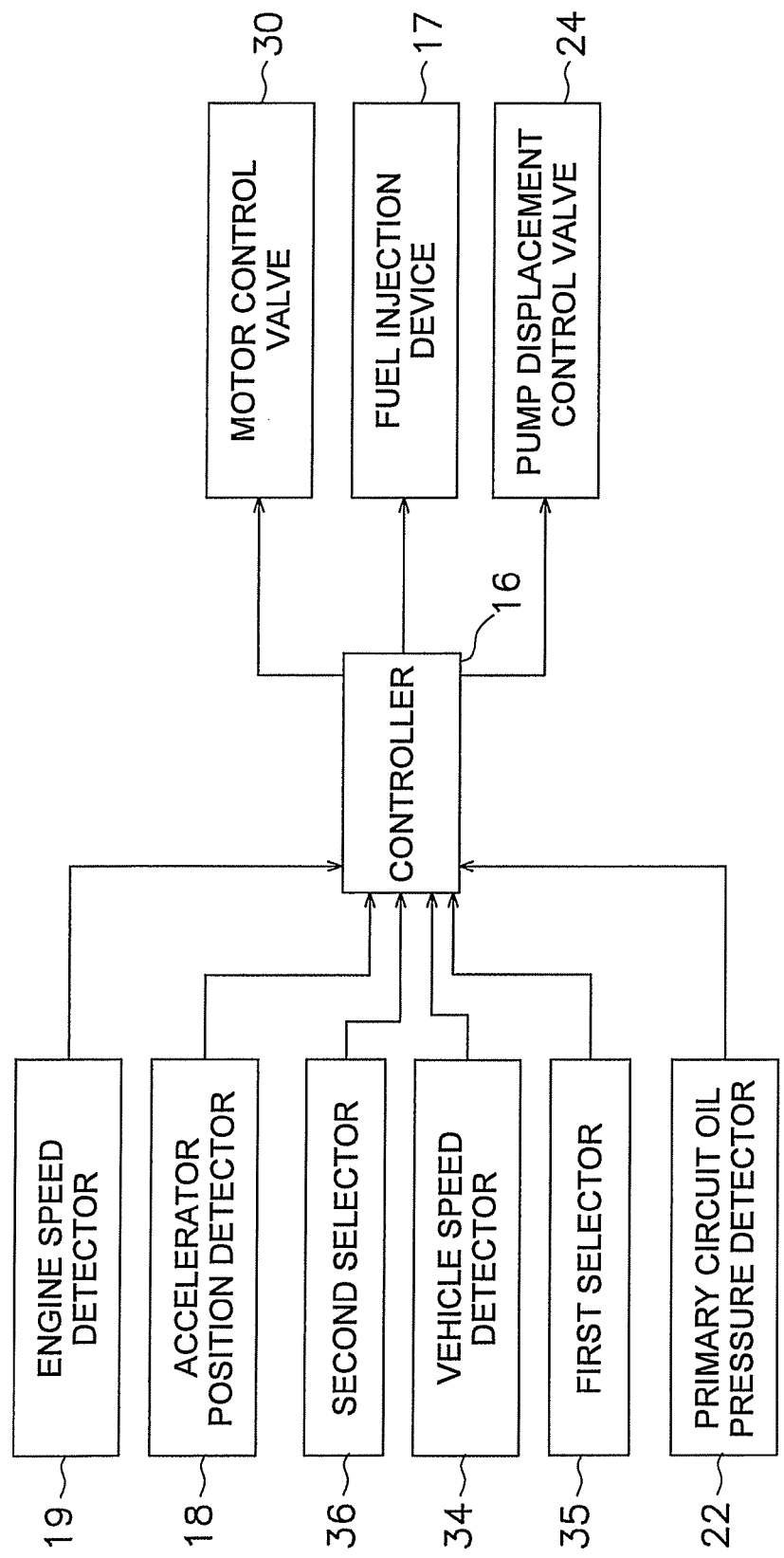
FIG. 3 is a control block diagram of the construction vehicle.

The hydraulic drive mechanism 7a has primarily an engine 8, a travel hydraulic pump 9, a charge pump 10, the work equipment hydraulic pump 11, a travel hydraulic motor 12, a drive shaft 15, and a controller 16 (see FIG. 3), and uses a so-called HST system.

The engine 8 is a diesel engine, and the output torque generated by the engine 8 is transmitted to the travel hydraulic pump 9, the charge pump 10, the work equipment hydraulic pump 11, a steering hydraulic pump (not shown), and other components. The engine 8 is equipped with a fuel injection device 17 for controlling the output torque and rotational speed of the engine 8, and the fuel injection device adjusts an engine speed directive value in accordance with the amount by which the accelerator is operated (hereinbelow referred to as the "accelerator position") and adjusts the sprayed amount of fuel. The accelerator is a means for indicating the target rotational speed of the engine 8, and is provided with an accelerator position detector 18 (see FIG. 3). The accelerator position detector 18 is configured from a potentiometer or the like, and the accelerator position detector detects the accelerator position. The accelerator position detector 18 sends a position signal indicating the accelerator position to the controller 16, and a control signal is outputted from the controller 16 to the fuel injection device 17. Therefore, the operator can control the rotational speed of the engine 8 by adjusting the amount by which the accelerator is operated. The engine 8 is also provided with an engine speed detector 19 (see FIG. 3) composed of a rotation sensor for detecting the actual rotational speed of the engine 8, and a rotational speed signal from the engine speed detector 19 is inputted to the controller 16.

The travel hydraulic pump 9 is a variable displacement hydraulic pump capable of varying displacement by varying the tilt angle of a swashplate, and is driven by the engine 8. Pressure oil discharged from the travel hydraulic pump 9 is sent to the travel hydraulic motor 12 through primary circuits 20, 21 (travel hydraulic circuits). The hydraulic drive mechanism 7a is provided with a primary circuit oil pressure detector 22 (travel circuit pressure detector) (see FIG. 3) for detecting the pressure (hereinbelow referred to as "primary circuit oil pressure") of the pressure oil passing through the primary circuits 20, 21. The primary circuit oil pressure (travel circuit pressure) is corresponding to drive oil pressure of the pressure oil for driving the travel hydraulic motor 12. Connected to the travel hydraulic pump 9 are a pump displacement control cylinder 23 and a pump displacement control valve 24 capable of varying the tilt angle of the swashplate of the travel hydraulic pump 9. The pump displacement control valve 24 has a link member 24a linked with a cylinder member 23a of the pump displacement control cylinder 23, and is capable of controlling, as required, the position of the cylinder member 23a on the basis of a control signal from the controller 16. Specifically, the pump displacement control valve 24 is an electromagnetic proportional control valve for controlling the pump displacement control cylinder 23 on the basis of a control signal from the controller 16, and is capable of switching the direction of oil supplied to the pump displacement control cylinder 23 as well as varying the tilt angle of the swashplate of the travel hydraulic pump 9 as required. Therefore, the controller 16 can vary the displacement of the travel hydraulic pump 9 as required by electrically controlling the pump displacement control valve 24.

The charge pump 10 is driven by the engine 8 and is capable of supplying pressure oil for actuating the pump displacement control cylinder 23 to the pump displacement control valve 24. The charge pump 10 also supplies pressure oil for actuating a motor cylinder 29 to a motor control valve 30.

A cutoff circuit 39 connected to a cutoff valve 31 is also connected to a circuit for supplying pressure oil from the charge pump 10 to the pump displacement control cylinder 23. The cutoff valve 31 is a decompression valve capable of reducing the pilot pressure to the pump displacement control cylinder 23 to a set pressure via the balance between spring force and the force of the primary circuit oil pressure. The cutoff valve 31 is configured so as to reduce the pilot pressure supplied to the pump displacement control cylinder 23 in cases in which the primary circuit oil pressure has become equal to or greater than a set cutoff pressure, and to limit the primary circuit oil pressure so as not to exceed the cutoff pressure value.

The work equipment hydraulic pump 11 is driven by the engine 8, the pressure oil discharged from the work equipment hydraulic pump 11 is fed to the work equipment cylinder 26 of the work equipment 3 via a work equipment hydraulic circuit 25, and the work equipment cylinder 26 is driven.

The travel hydraulic motor 12 is a variable displacement hydraulic motor capable of varying displacement by varying the tilt angle of an inclined shaft, and is driven by pressure oil discharged from the travel hydraulic pump 9 to generate drive force for traveling. The travel hydraulic motor 12 is provided with a motor cylinder 29 for controlling the tilt angle of the travel hydraulic motor 12, and a motor control valve 30 (see FIG. 3) for controlling the motor cylinder 29. The motor control valve 30 is an electromagnetic control valve controlled based on a control signal from the controller 16, and the displacement of the travel hydraulic motor 12 can be varied as required by controlling the motor cylinder 29.

The drive shaft 15 causes the tires 4a, 4b to rotate by the transmission of drive force from the travel hydraulic motor 12 to the tires 4a, 4b (see FIG. 1). The drive shaft 15 is also provided with a vehicle speed detector 34 (see FIG. 3) composed of a vehicle speed sensor for detecting the vehicle speed from the rotational speed of the drive shaft 15, and a vehicle speed signal from the vehicle speed detector 34 is inputted to the controller 16.

The controller 16 electronically controls the control valves and the fuel injection device 17 on the basis of output signals from the detectors, and the controller can control the engine speed, the displacement of the hydraulic pumps 9 to 11, the displacement of the travel hydraulic motor 12, and other factors. For example, by electrically controlling the pump displacement control valve 24, the controller 16 can control the displacement of the travel hydraulic pump 9. The traction force and vehicle speed thereby vary continuously in the construction vehicle 1, and the vehicle speed can automatically change from zero to the maximum vehicle speed without a speed-changing operation (see FIG. 6). The construction vehicle 1 comprises a first selector 35, and the operation of the first selector 35 by an operator causes the controller 16 to implement traction force limit control for limiting the maximum traction force. The construction vehicle 1 also comprises a second selector 36, and the operation of the second selector 36 by an operator causes the controller 16 to implement pump displacement rapid change suppression control. Travel control in the construction vehicle 1 is described in detail hereinbelow.

Control of Travel Hydraulic Pump 9 and Travel Hydraulic Motor 12

Figure 4:
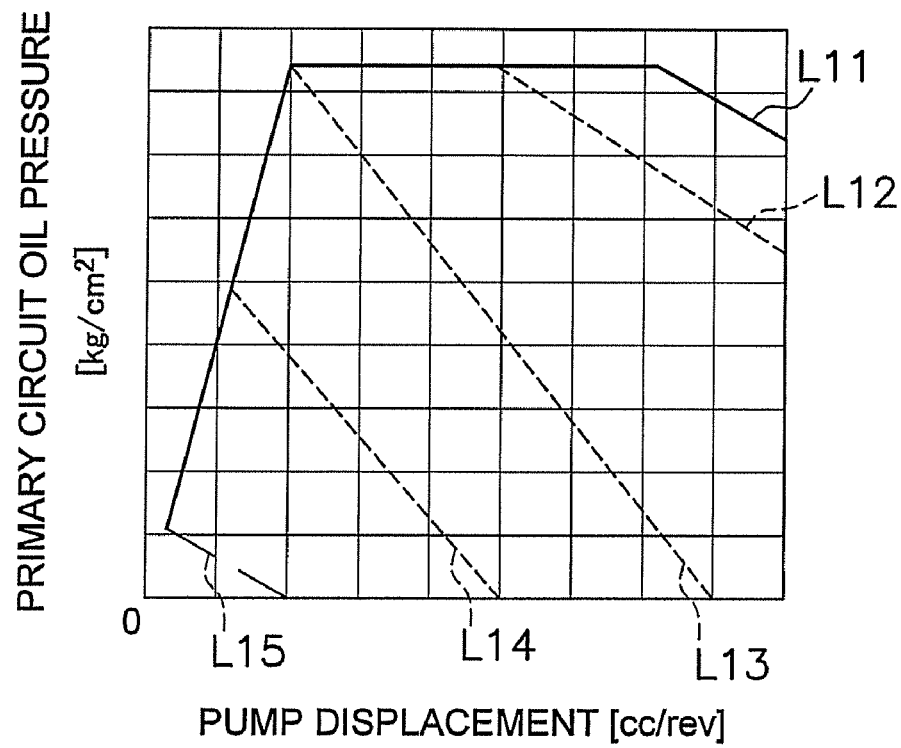
FIG. 4 is a graph showing an example of pump displacement-primary circuit oil pressure characteristics data.

The controller 16 processes the output signals from the engine speed detector 19 and the primary circuit oil pressure detector 22 and outputs pump displacement directive signals to the pump displacement control valve 24. The controller 16 refers to the pump displacement-primary circuit oil pressure characteristics data stored in the controller 16, sets the pump displacement from the value of the engine speed and the value of the primary circuit oil pressure, and outputs a pump displacement directive value corresponding to the set pump displacement to the pump displacement control valve 24. The use of "pump displacement" alone hereinbelow refers to the displacement of the travel hydraulic pump 9. FIG. 4 shows an example of the pump displacement-primary circuit oil pressure characteristics data. The solid line L11 and the dashed lines L12 to L15 in the diagram are lines showing pump displacement-primary circuit oil pressure characteristics (hereinbelow referred to as "PQ characteristics") which vary according to the engine speed. The pump displacement control valve 24 varies the tilt angle of the travel hydraulic pump 9 by controlling the pump displacement control cylinder 23 on the basis of the inputted pump displacement directive value. The pump displacement is thereby controlled so as to correspond to the engine speed.

Figure 5:
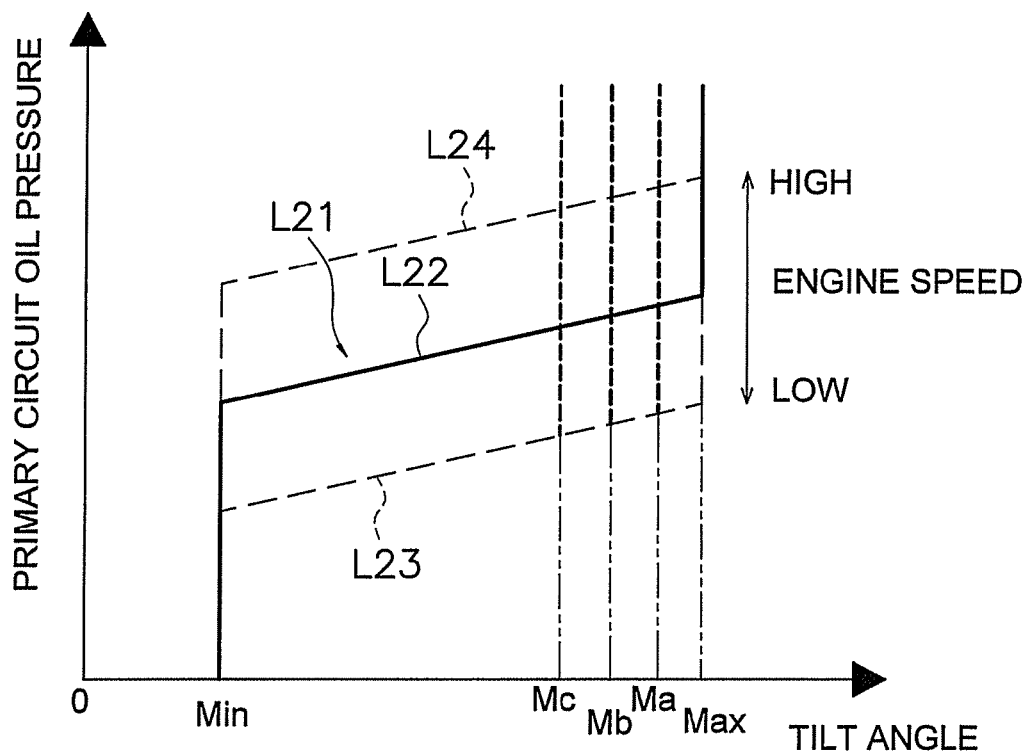
FIG. 5 is a graph showing an example of motor displacement-primary circuit oil pressure characteristics data.

The controller 16 also processes output signals from the engine speed detector 19 and the primary circuit oil pressure detector 22 and outputs a motor displacement directive signal to the motor control valve 30. The controller 16 refers to motor displacement-primary circuit oil pressure characteristics data stored in the controller 16, sets the motor displacement from the value of the engine speed and the value of the primary circuit oil pressure, and outputs a tilt angle change command corresponding to the set motor displacement to the motor control valve 30. FIG. 5 shows an example of the motor displacement-primary circuit oil pressure characteristics data. The solid line L21 in the diagram is a line in which the tilt angle in relation to the primary circuit oil pressure is established, when the engine speed is at a certain value. The tilt angle is at a minimum (Min) while the primary circuit oil pressure is at a specific value or less, then the tilt angle gradually increases (slanted portion L22 of the solid line) as the primary circuit oil pressure increases, and after the tilt angle has reached a maximum (Max), the tilt angle remains at the maximum tilt angle Max even if the oil pressure rises. The slanted portion L22 of the solid line is set so as to increase and decrease according to the engine speed. Specifically, if the engine speed is low, the tilt angle increases from a state of lower primary circuit oil pressure, and the tilt angle is controlled so as to reach the maximum tilt angle in the state of lower primary circuit oil pressure (refer to the slanted portion L23 of the lower dashed line in FIG. 5). Conversely, if the engine speed is high, the tilt angle remains at the minimum tilt angle Min until the primary circuit oil pressure increases further, and the tilt angle is controlled so as to reach the maximum tilt angle Max in a state of higher primary circuit oil pressure (refer to the slanted portion L24 of the upper dashed line in FIG. 5).

Traction Force Limit Control

The controller 16 switches the maximum value of the tilt angle of the travel hydraulic motor 12 on the basis of an output signal from the first selector 35 and limits the maximum displacement of the travel hydraulic motor 12 to a predetermined limit value, thereby limiting the maximum traction force. In the construction vehicle 1, the first selector 35 can be switched between an on state and an off state. The maximum traction force in the on state can be varied between three levels: level A, level B, and level C. When the first selector 35 is in the off state, the maximum tilt angle is at the Max position in FIG. 5, and the vehicle speed-traction force characteristics in this state are represented by the graph L1 in FIG. 6. This maximum tilt angle Max is a maximum value of the performance of the travel hydraulic motor 12. When the first selector 35 is turned to the on state, the maximum tilt angle is changed to an extent corresponding with the level of the set maximum traction force. Specifically, when the maximum traction force in the on state is set to level A, the maximum tilt angle changes to Ma. Similarly, when the maximum traction force is set to level B, the maximum tilt angle changes to Mb, and when the maximum traction force is set to level C, the maximum tilt angle changes to Mc. Thus, the maximum tilt angle changes to Ma, Mb, and Mc, which are less than Max, resulting in vehicle speed-traction force characteristics in which the maximum traction force has decreased, such as in graphs La, Lb, and Lc in FIG. 6. It is thereby possible to suppress the drive force of the tires 4a, 4b to prevent slipping, even when the accelerator position is set to maximum in order to ensure an amount of work by the work equipment 3 on soft roads, snowy roads, or other roads having low friction, or in cases in which the weight of gathered objects is comparatively low. The graphs L1, La, Lb, and Lc all represent vehicle speed-traction force characteristics in a state of the accelerator position being fully open.

Pump Displacement Rapid Change Suppression Control

The controller 16 is capable of implementing pump displacement rapid change suppression control on the basis of the output from the second selector 36. Pump displacement rapid change suppression control is for controlling the displacement of the travel hydraulic pump 9 so that the displacement of the travel hydraulic pump 9 gradually changes according to the change in primary circuit oil pressure while the primary circuit oil pressure is limited so as not to exceed the cutoff pressure value.

Figure 7:
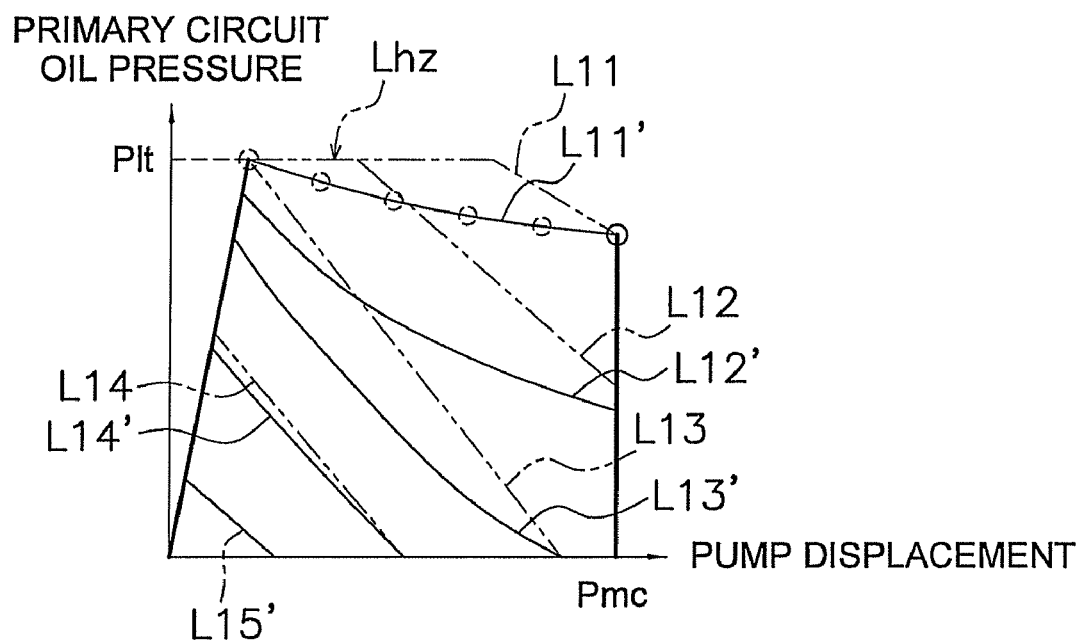
FIG. 7 is a graph showing pump displacement-primary circuit oil pressure characteristics data for each engine speed during pump displacement rapid change suppression control.

During pump displacement rapid change suppression control, the controller 16 determines the displacement of the travel hydraulic pump 9 on the basis of the graph shown in FIG. 7. In this graph, the displacement of the travel hydraulic pump 9 has been determined relative to the primary circuit oil pressure, and the lines L11' to L15' show PQ characteristics data which vary according to the engine speed. Denoting the engine speeds sequentially in relation to the lines L11' to L15' as N1, N2, N3, N4, N5, the speeds have the relationship N1>N2>N3>N4>N5. The PQ characteristics data shown in FIG. 7 is used in cases in which pump displacement rapid change suppression control has been selected, and there are also characteristics differing from the PQ characteristics data L11 to L15 (refer to the double-dashed lines) in cases in which pump displacement rapid change suppression control has not been selected. Numerical symbols associated with PQ characteristics data which have the same numerals represent the same engine speed. For example, the line L11 and the line L11' represent PQ characteristics data at the same engine speed, and differ in whether or not pump displacement rapid change suppression control has been selected. The controller 16 controls the displacement of the travel hydraulic pump 9 on the basis of the primary circuit oil pressure detected by the primary circuit oil pressure detector 22, the engine speed detected by the engine speed detector 19, and their PQ characteristics data.

Specifically, in the PQ characteristics data shown in FIG. 7, the primary circuit oil pressure reaches a maximum value equal to or less than the cutoff pressure value Plt when the vehicle has stopped, and the displacement of the travel hydraulic pump 9 gradually increases as the primary circuit oil pressure decreases from the maximum value. In other words, the displacement of the travel hydraulic pump 9 gradually decreases as the primary circuit oil pressure increases, and the primary circuit oil pressure reaches a maximum value equal to or less than the cutoff pressure value Plt when the vehicle has stopped. Therefore, the PQ characteristics data L11' to L14' in cases in which displacement rapid change suppression control has been selected is different from the PQ characteristics data L11 to L14 in cases in which pump displacement rapid change suppression control has not been selected. Specifically, of the PQ characteristics data L11 to L15 in cases in which pump displacement rapid change suppression control has not been selected, the PQ characteristics data L11, L12 corresponding to engine speeds equal to or greater than a predetermined rotational speed have a horizontal line Lhz wherein the primary circuit oil pressure does not change even if the pump displacement does change. In this portion, the primary circuit oil pressure remains constant at the cutoff pressure value Plt and the primary circuit oil pressure does not change even if the pump displacement does change. This is because the cutoff circuit operates, suppressing increases in the primary circuit oil pressure and maintaining a constant primary circuit oil pressure at the cutoff pressure value Plt. With the PQ characteristics data L11', L12' used in cases in which pump displacement rapid change suppression control has been selected, there is no such aforementioned horizontal line regardless of the engine speed, and the pump displacement gradually changes according to changes in the primary circuit oil pressure. Of the PQ characteristics data L11' to L15' in cases in which pump displacement rapid change suppression control has been selected, the PQ characteristics data L15' in cases of a relatively low engine speed is the same as the PQ characteristics data L15 in cases in which pump displacement rapid change suppression control has not been selected.

Figure 6:
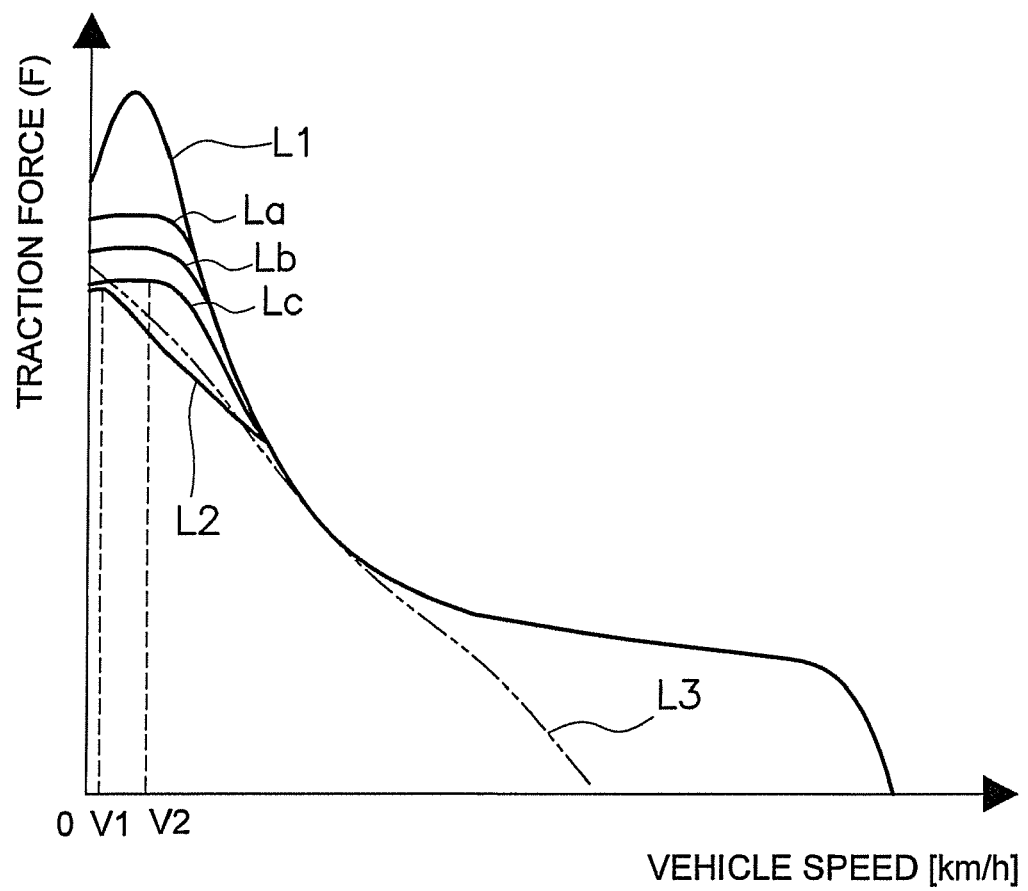
FIG. 6 is a graph showing vehicle speed-traction force characteristics.

During pump displacement rapid change suppression control as described above, the displacement of the travel hydraulic pump 9 is controlled so that the primary circuit oil pressure and the pump displacement change along the lines shown by the PQ characteristics L11' to L15' in FIG. 7. The vehicle speed-traction force characteristics shown by the graph L2 in FIG. 6 are thereby obtained. This vehicle speed-traction force characteristics resembles the vehicle speed-traction force characteristics of a vehicle equipped with a torque converter (refer to the graph L3). The vehicle speed-traction force characteristics of a vehicle equipped with a torque converter constitute a monotonically decreasing function, and the maximum traction force reaches a maximum at the point in time when the vehicle speed is zero. The graph Lc represents vehicle speed-traction force characteristics when level C traction force limit control is being performed but pump displacement rapid change suppression control is not being performed (an accelerator position of 100%). The graph L2 represents vehicle speed-traction force characteristics when pump displacement rapid change suppression control has been performed along with level C traction force limit control. In this graph L2, the maximum traction force is shown as occurring at a lower speed than the maximum traction force in the vehicle speed-traction force characteristics shown by the graph Lc. Specifically, the vehicle speed V1 where the maximum traction force occurs in the vehicle speed-traction force characteristics in cases of pump displacement rapid change suppression control is less than the vehicle speed V2 where the maximum traction force occurs in the vehicle speed-traction force characteristics (refer to Lc) in cases of no pump displacement rapid change suppression control, at 1 km/h, for example.

Pump displacement rapid change suppression control may also be performed along with level B or level A traction force limit control, rather than level C traction force limit control.

The controller 16 ends pump displacement rapid change suppression control in cases in which the second selector 36 has been set to off.

Characteristics (1) In the construction vehicle 1, during pump displacement rapid change suppression control, conditions in which the primary circuit oil pressure does not change even if the pump displacement does change are suppressed, because the pump displacement control valve 24 is controlled so that the displacement of the travel hydraulic pump 9 gradually changes according to changes in the primary circuit oil pressure. Therefore, rapid changes in the pump displacement are suppressed. Rapid accelerations and occurrences of slipping on low friction roads can thereby be reduced.

Vehicle speed-traction force characteristics resembling the vehicle speed-traction force characteristics of a vehicle equipped with a torque converter can be obtained by controlling the pump displacement control valve 24 as described above. Since a vehicle equipped with a torque converter has linear vehicle speed-traction force characteristics in which the traction force reaches a maximum at a vehicle speed of zero and the traction force decreases in accordance with increases in vehicle speed, obtaining similar vehicle speed-traction force characteristics makes it possible for an operator to easily perform in travel operations.

(2) In the construction vehicle 1, since the displacement of the travel hydraulic pump 9 is controlled during pump displacement rapid change suppression control, there is little chance of affecting the displacement of other hydraulic pumps, i.e., of the work equipment hydraulic pump 11, in comparison with cases in which the rotational speed of the engine 8 is limited. Therefore, it is possible to suppress reductions in the drive speed of the work equipment 3 while pump displacement rapid change suppression control is being implemented.

Second Embodiment

Configuration

Figure 8:
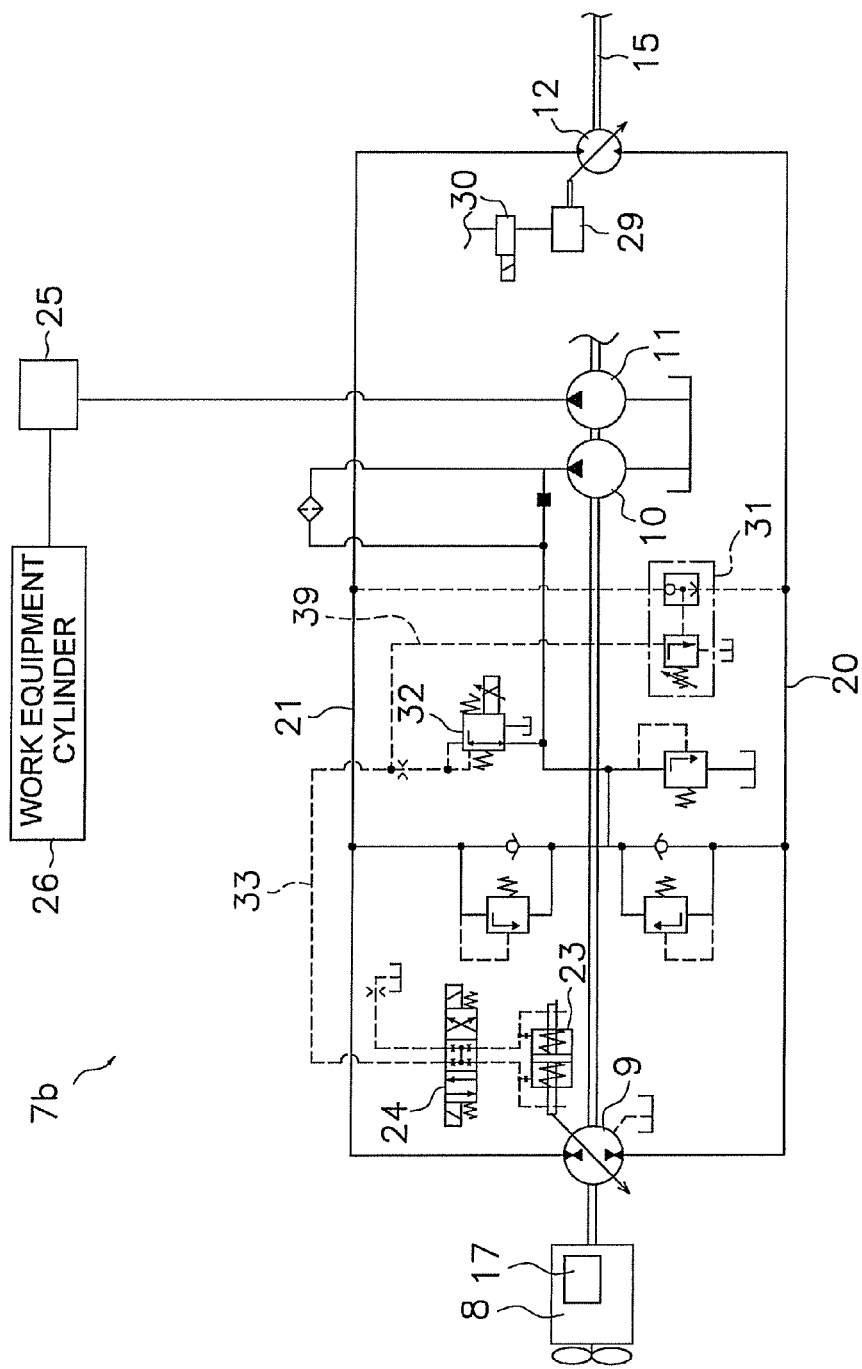
FIG. 8 is a drawing showing the configuration of the hydraulic drive mechanism according to the second embodiment.

FIG. 8 shows the configuration of a hydraulic drive mechanism 7b of a construction vehicle 1 according to the second embodiment of the present invention.

In this hydraulic drive mechanism 7b, connected to the travel hydraulic pump 9 are a direction control valve 24 and a pump displacement control cylinder 23 capable of varying the tilt angle of the swashplate of the travel hydraulic pump 9. The pump displacement control cylinder 23 functions as a pump displacement control mechanism for controlling the displacement of the travel hydraulic pump 9 by varying the tilt angle of the swashplate of the travel hydraulic pump 9 in accordance with the pilot pressure supplied.

The direction control valve 24 is an electromagnetic control valve for controlling the direction of pressure oil supplied to the pump displacement control cylinder 23 on the basis of a control signal from the controller 16. The action of the direction control valve 24 enables the construction vehicle 1 to switch between forward and reverse travel. A vehicle speed response control valve 32 is provided to the circuit for supplying pressure oil from the charge pump 10 to the pump displacement control cylinder 23. The vehicle speed response control valve 32 is an electromagnetic proportional pressure control valve capable of controlling, as required, the pilot pressure supplied to the pump displacement control cylinder 23 according to a control signal from the controller 16. The vehicle speed response control valve 32 is capable of varying the displacement of the travel hydraulic pump 9 by controlling the pilot pressure supplied to the pump displacement control cylinder 23.

As described above, in the hydraulic drive mechanism 7b, the controller 16 electrically controls the vehicle speed response control valve 32 and controls the pilot pressure supplied to the pump displacement control cylinder 23, whereby the displacement of the travel hydraulic pump 9 can be varied as required.

The configuration is otherwise similar to that of the construction vehicle of the first embodiment.

Control of Travel Hydraulic Pump 9 and Travel Hydraulic Motor 12

Next, control of the travel hydraulic pump 9 and the travel hydraulic motor 12 in this construction vehicle will be described.

Figure 9:
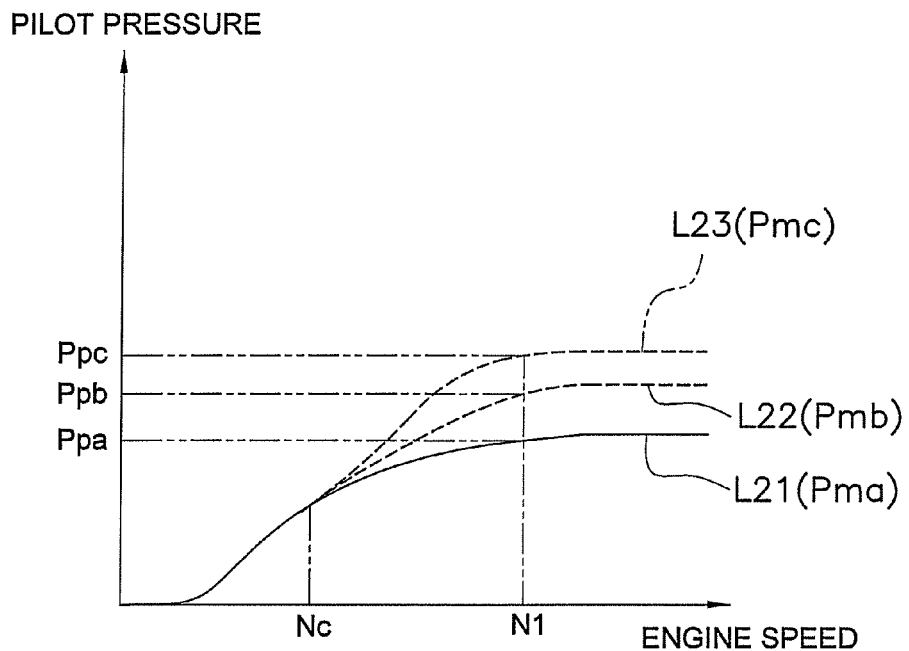
FIG. 9 is a graph showing engine speed-pilot pressure characteristics data for each vehicle speed during pump displacement rapid change suppression control.

The controller 16 outputs a pump displacement directive signal to the vehicle speed response control valve 32 in accordance with the engine speed and the primary circuit oil pressure. Referring to engine speed-pilot pressure characteristics data stored in the controller 16, the controller 16 sets the pump displacement from the engine speed value and the primary circuit oil pressure and outputs a directive value corresponding to the set pump displacement to the vehicle speed response control valve 32. FIG. 9 shows an example of engine speed-pilot pressure characteristics data. The solid line L21 and the dashed lines L22, L23 in the diagram are lines representing engine speed-pilot pressure characteristics data which changes according to the primary circuit oil pressure. The vehicle speed response control valve 32 varies the tilt angle of the travel hydraulic pump 9 by controlling the pump displacement control cylinder 23 on the basis of the directive value inputted from the controller 16. The displacement of the travel hydraulic pump 9 is thereby controlled so as to correspond to the engine speed.

The controller 16 also processes output signals from the engine speed detector 19 and primary circuit oil pressure detector 22 and outputs a motor displacement directive signal to the motor control valve 30. Referring to engine speed-primary circuit oil pressure characteristics data stored in the controller 16, the controller 16 outputs a tilt angle-varying command to the motor control valve 30 so as to increase the motor displacement from the actual engine speed value and primary circuit oil pressure value.

In this construction vehicle, traction force limit control and pump displacement rapid change suppression control can be implemented, similar to the construction vehicle according to the first embodiment. Traction force limit control is a control similar to that of the construction vehicle according to the first embodiment and is therefore not described. Pump displacement rapid change suppression control is described hereinbelow.

Pump Displacement Rapid Change Suppression Control

The controller 16 is capable of implementing pump displacement rapid change suppression control on the basis of output from the second selector 36. The pump displacement rapid change suppression control in this construction vehicle is mostly similar to that of the construction vehicle according to the first embodiment in that the displacement of the travel hydraulic pump 9 is controlled so that the displacement of the travel hydraulic pump 9 gradually changes in accordance with changes in the primary circuit oil pressure while the primary circuit oil pressure is limited so as not to exceed the cutoff pressure value Plt. However the pump displacement rapid change suppression control in this construction vehicle differs that of the construction vehicle according to the first embodiment in that the pump displacement is controlled by controlling the vehicle speed response control valve 32.

Figure 10:
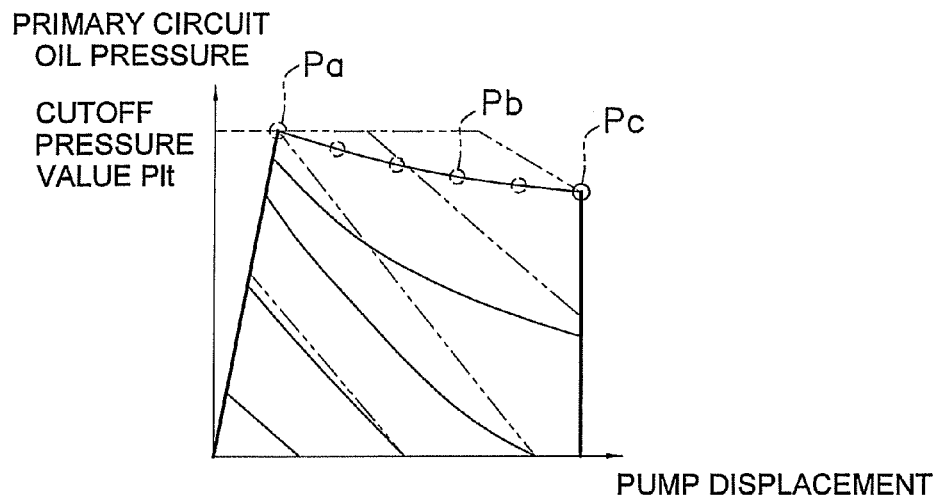
FIG. 10 is a graph showing the pump displacement-primary circuit oil pressure characteristics for each engine speed during pump displacement rapid change suppression control.

The pilot pressure supplied to the pump displacement control cylinder 23 is determined based on the primary circuit oil pressure and engine speed. For example, at the primary circuit oil pressure Pma, the engine speed-pilot pressure characteristics data shown by the line L21 in FIG. 9 is used. At the primary circuit oil pressure Pmb, the engine speed-pilot pressure characteristics data shown by the line L22 in FIG. 9 is used, and at the primary circuit oil pressure Pmc, the engine speed-pilot pressure characteristics data shown by the line L23 in FIG. 9 is used. The relationship of these pressures is Pma>Pmb>Pmc. In the engine speed-pilot pressure characteristics data L21 to L23, when the engine speed is equal to or greater than a predetermined value Nc, the pilot pressure is set so as to decrease as the primary circuit oil pressure increases if the engine speed remains the same. For example, at the rotational speed N1 (>Nc), the pilot pressure is Ppa at the primary circuit oil pressure Pma. The travel hydraulic pump 9 is thereby driven with the primary circuit oil pressure and pump displacement corresponding to the point Pa in FIG. 10. With the same engine speed N1, the pilot pressure is Ppb at the primary circuit oil pressure Pmb. The travel hydraulic pump 9 is thereby driven with the primary circuit oil pressure and pump displacement corresponding to the point Pb. With the same engine speed N1, the pilot pressure is Ppc at the primary circuit oil pressure Pmc. The travel hydraulic pump 9 is thereby driven with the primary circuit oil pressure and pump displacement corresponding to the point Pc. The pressures have the relationship Ppa<Ppb<Ppc. PQ characteristics such as those shown in FIG. 10 are thereby exhibited. During pump displacement rapid change suppression control, controlling the pilot pressure causes PQ characteristics to be exhibited which are similar to the PQ characteristics data L11' to L15' in the pump displacement rapid change suppression control of the first embodiment, as can be seen from FIG. 10. Vehicle speed-traction force characteristics similar to those of the pump displacement rapid change suppression control of the first embodiment (see FIG. 6) are also thereby exhibited.

Characteristics

With this construction vehicle, the same effects can be exhibited as those of the construction vehicle according to the first embodiment described above.

In the present embodiment, during pump displacement rapid change suppression control, the pilot pressure supplied to the pump displacement control cylinder 23 is controlled according to the strength of the primary circuit oil pressure, but the pilot pressure may also be controlled according to the vehicle speed rather than the primary circuit oil pressure. In this case, the engine speed-pilot pressure characteristics data L21 to L23 shown in FIG. 9 is set so that at an engine speed equal to or greater than a predetermined value Nc, pilot pressure decreases as vehicle speed decreases if the engine speed remains the same.

Other Embodiments (A) In the embodiment described above, the present invention is applied to a wheel loader, but the present invention is not limited to a wheel loader and can be applied to any construction vehicle that travels by means of a hydraulic motor and has an HST installed.

(B) In the embodiment described above, pump displacement rapid change suppression control is performed when selected by the second selector 36, but pump displacement rapid change suppression control may also be performed automatically without being selected by an operator. Nearly linear vehicle speed-traction force characteristics are thereby obtained during low-speed operations, and the operator can delicately operate the accelerator more easily.

(C) In the first embodiment described above, pump displacement rapid change suppression control is performed by electrically controlling the pump displacement control valve 24, but other control means may be used if the displacement of the travel hydraulic pump 9 is controlled so as to obtain the primary circuit oil pressure-pump displacement characteristics shown in FIG. 7.

Figure 11:
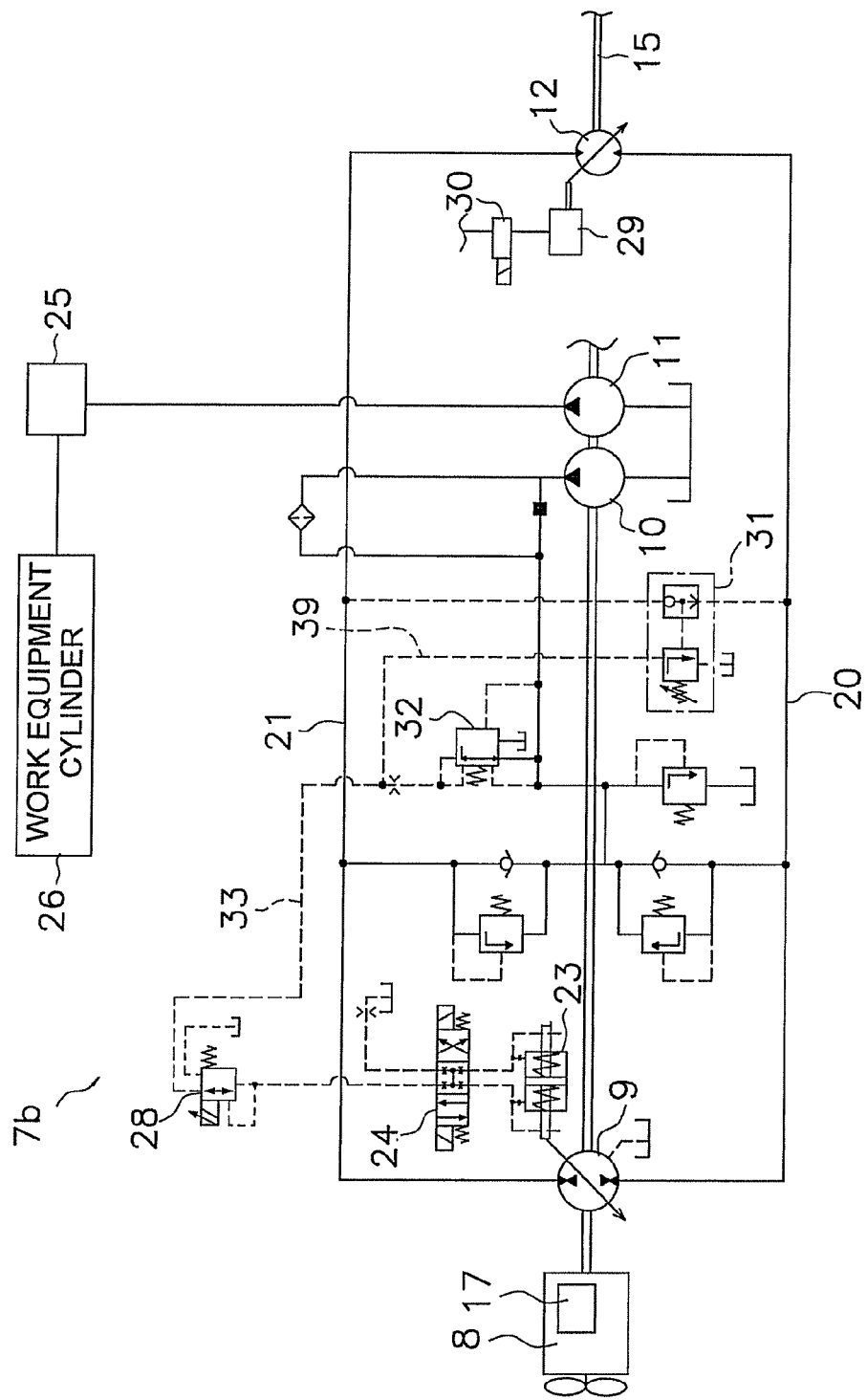
FIG. 11 is a drawing showing the configuration of a hydraulic drive mechanism according to another embodiment.

(D) In the second embodiment described above, the pilot pressure supplied to the pump displacement control cylinder 23 is controlled as required by controlling the vehicle speed response control valve 32 according to a control signal from the controller 16. However, the pilot pressure upper limit corresponding to the engine speed, which is controlled by the vehicle speed response control valve 32, may also be controlled by controlling a decompression valve 28 according to a control signal from the controller 16, as shown in FIG. 11. The decompression valve 28 is an electromagnetic proportional pressure control valve for connecting the direction control valve 24 and a pilot circuit 33 through which pressure oil discharged from the charge pump 10 passes, and the decompression valve 28 is capable of controlling, as required, the pilot pressure supplied to the pump displacement control cylinder 23 according to a control signal from the controller 16.

Figure 12:
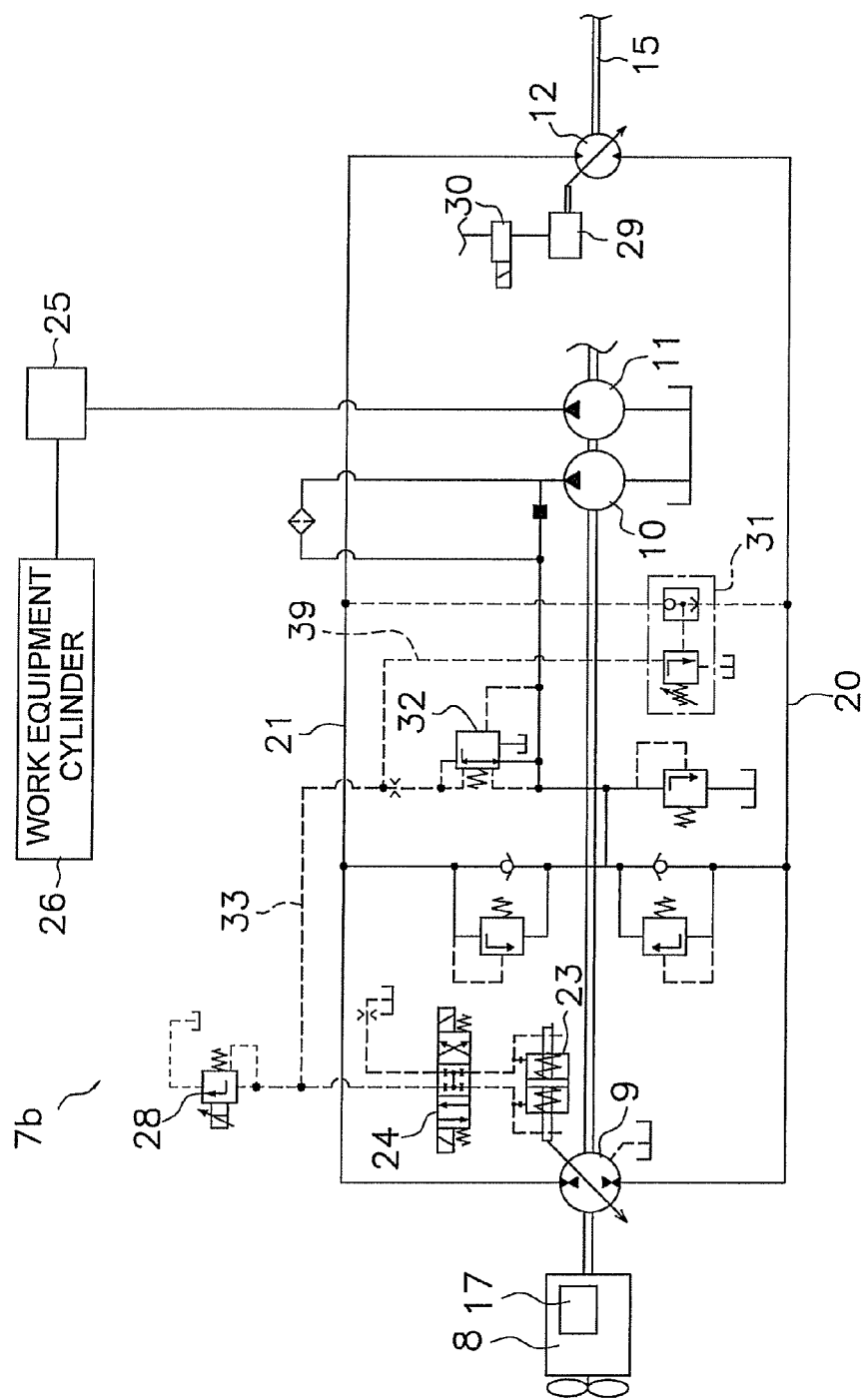
FIG. 12 is a drawing showing the configuration of a hydraulic drive mechanism according to another embodiment.
Figure 13:
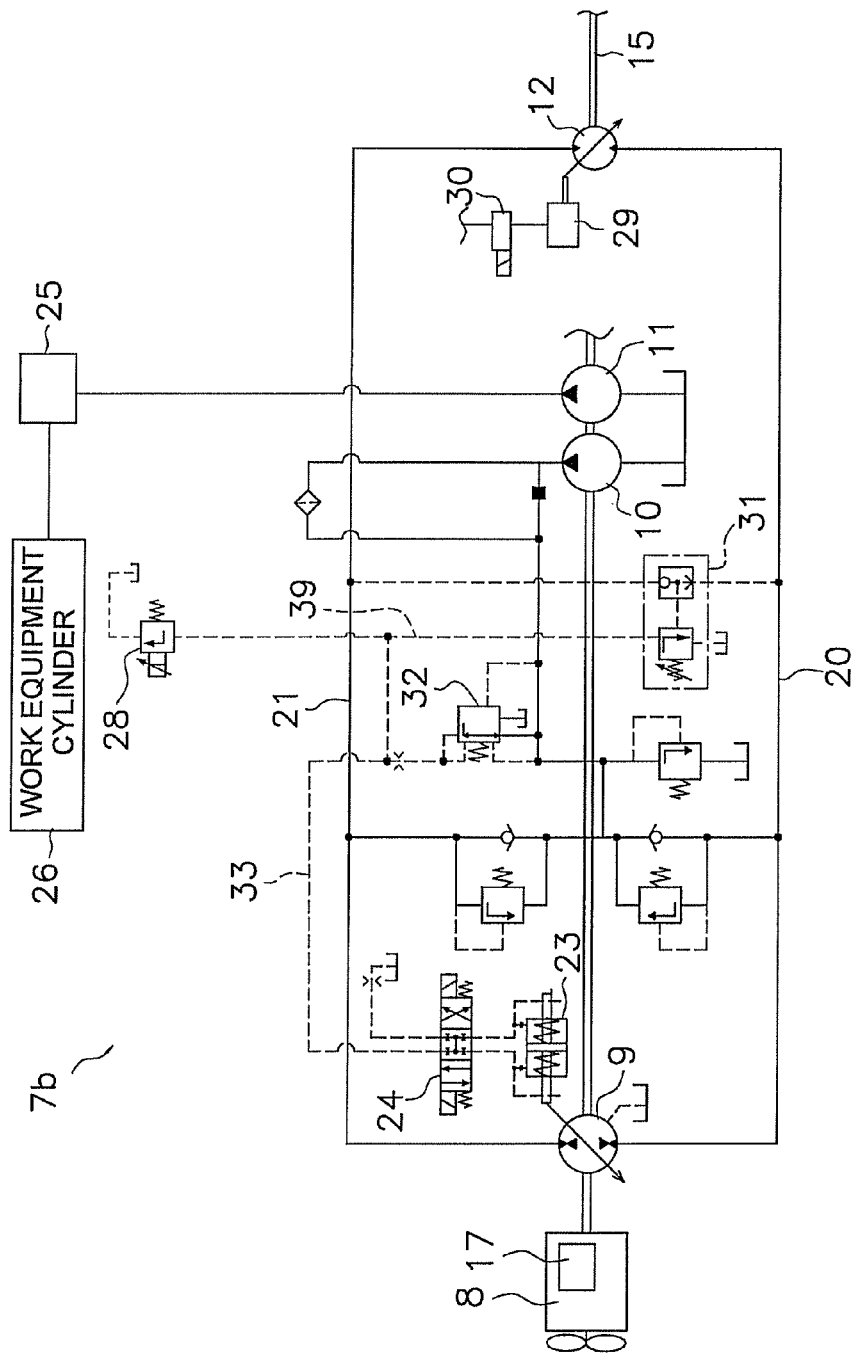
FIG. 13 is a drawing showing the configuration of a hydraulic drive mechanism according to another embodiment.
Figure 14:
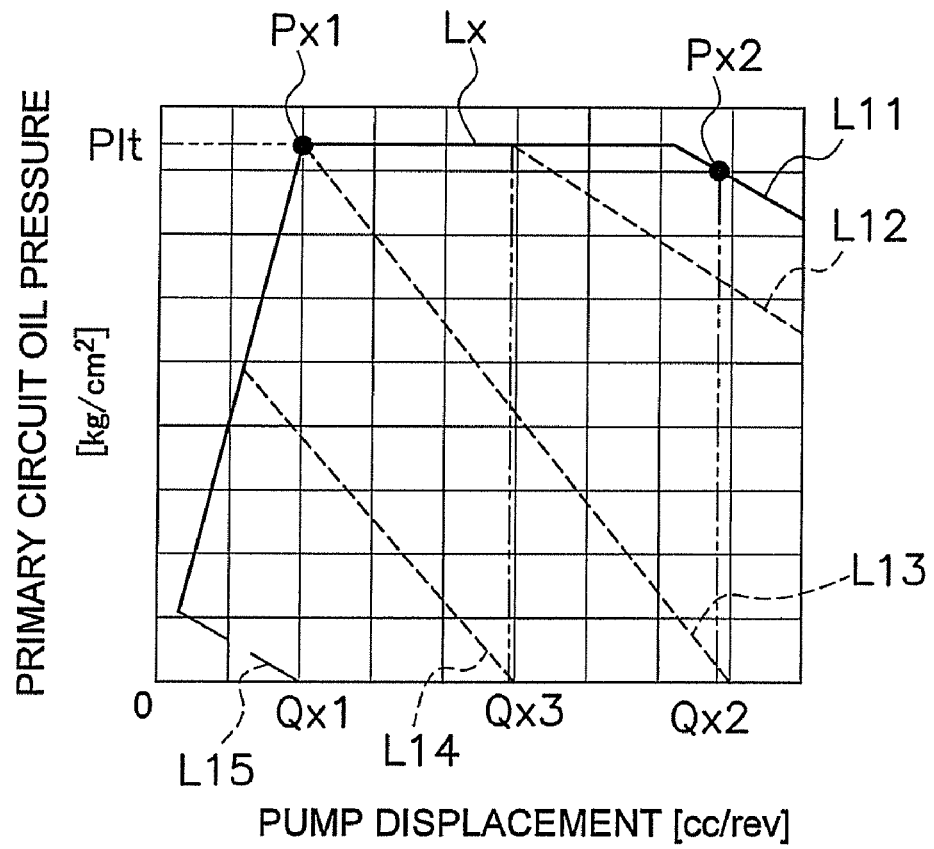
FIG. 14 is a graph showing the motor displacement-primary circuit oil pressure characteristics of a conventional construction vehicle.
Figure 15:
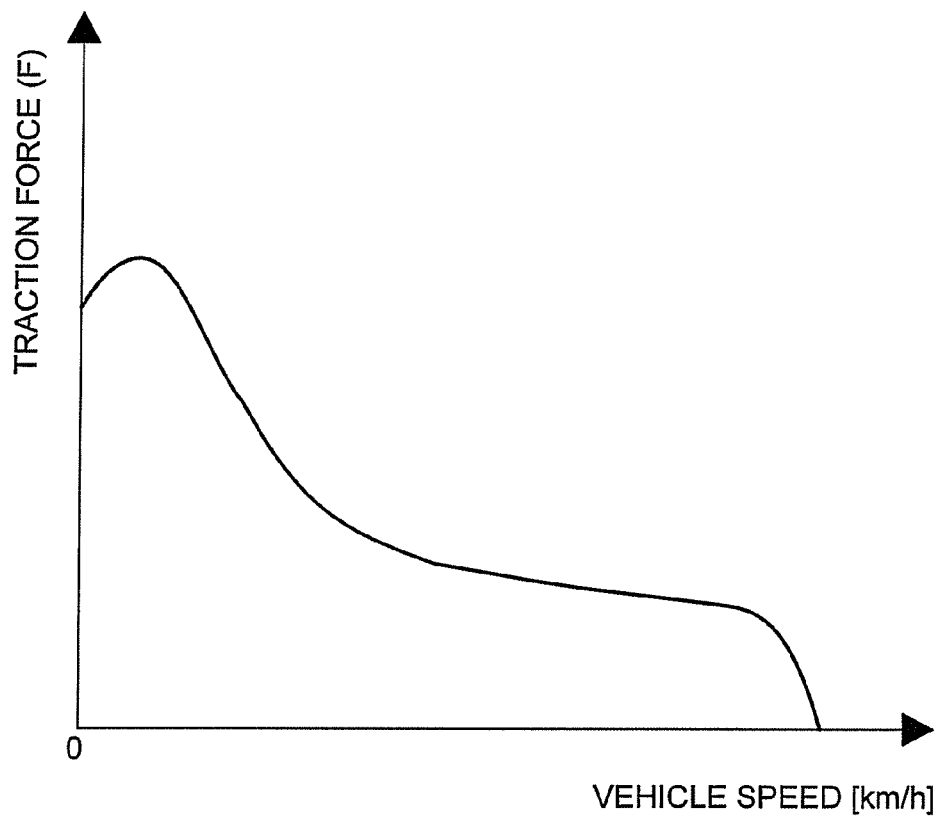
FIG. 15 is a graph showing the vehicle speed-traction force characteristics of a conventional construction vehicle.

The position at which the decompression valve 28 is provided is also not limited to the aforementioned position. For example, the decompression valve 28 may be provided as divergent from the pilot circuit 33, as shown in FIG. 12. The decompression valve 28 may also be provided as divergent from the cutoff circuit 39 connected to the pilot circuit 33, as shown in FIG. 13. Furthermore, the decompression valve is not limited to only one. Two decompression valves may be provided, one being a forward travel decompression valve for supplying pilot pressure for forward travel to the pump displacement control cylinder 23 and the other being a reverse travel decompression valve for supplying pilot pressure for reverse travel to the pump displacement control cylinder 23, and the pilot pressure supplied to the pump displacement control cylinder 23 may be controlled in both decompression valves. In this case, the direction control valve 24 is omitted. In hydraulic circuits such as these, the pilot pressure supplied to the pump displacement control cylinder 23 can be controlled so as to obtain primary circuit oil pressure-pump displacement characteristics such as those shown in FIG. 10.

(E) In the first embodiment described above, the pump displacement is controlled based on the primary circuit oil pressure and the engine speed, but the vehicle speed may also be used as a factor instead of the primary circuit oil pressure.

The illustrated embodiments have the effect of making it possible to suppress tire slippage and sudden accelerations, and the present invention is useful as a construction vehicle.

The invention claimed is:

1. A construction vehicle comprising:
   an engine;
   a travel hydraulic pump driven by the engine;
   a travel hydraulic circuit through which pressure oil discharged from the travel hydraulic pump flows;
   a travel hydraulic motor driven by the pressure oil supplied through the travel hydraulic circuit;
   a travel wheel driven by drive force of the travel hydraulic motor;
   a work equipment hydraulic pump driven by the engine;
   a work equipment driven by pressure oil discharged from the work equipment hydraulic pump;
   a controller configured to control an engine speed, displacement of the travel hydraulic pump, and displacement of the travel hydraulic motor so as to control a vehicle speed and traction force; and
   an oil pressure limiting component configured to limit travel circuit pressure so as not to exceed a predetermined cutoff pressure value, the travel circuit pressure corresponding to pressure of pressure oil flowing through the travel hydraulic circuit;
   the controller being configured to implement a pump displacement rapid change suppression control for controlling the displacement of the travel hydraulic pump so that the travel circuit pressure reaches a maximum value equal to or less than the cutoff pressure value when the vehicle has stopped regardless of the engine speed, and the displacement of the travel hydraulic pump gradually increases as the travel circuit pressure decreases from the maximum value.

2. The construction vehicle according to claim 1, further comprising
   a travel circuit pressure detector configured and arranged to detect the travel circuit pressure, and
   an engine speed detector configured and arranged to detect the engine speed,
   the controller being configured to control the displacement of the travel hydraulic pump during the pump displacement rapid change suppression control on the basis of the travel circuit pressure detected by the travel circuit pressure detector and the engine speed detected by the engine speed detector.

3. The construction vehicle according to claim 1, further comprising
   a vehicle speed detector configured and arranged to detect vehicle speed, and
   an engine speed detector configured and arranged to detect the engine speed,
   the controller being configured to control the displacement of the travel hydraulic pump on the basis of the vehicle speed detected by the vehicle speed detector and the engine speed detected by the engine speed detector during the pump displacement rapid change suppression control.

4. The construction vehicle according to claim 1, further comprising
   an electromagnetic proportional control valve configured and arranged to change the displacement of the travel hydraulic pump,
   the controller being configured to control the displacement of the travel hydraulic pump by electrically controlling the electromagnetic proportional control valve.

5. The construction vehicle according to claim 1, further comprising
   a pump displacement control mechanism configured and arranged to vary the displacement of the travel hydraulic pump in accordance with supplied pilot pressure, and
   a pressure control valve configured and arranged to change the pilot pressure supplied to the pump displacement control mechanism,
   the controller being configured to control the displacement of the travel hydraulic pump by electrically controlling the pressure control valve.

6. The construction vehicle according to claim 1, wherein
   the controller is configured to control the displacement of the travel hydraulic pump during the pump displacement rapid change suppression control so that maximum traction force in vehicle speed-traction force characteristics occurs at a lower speed than the maximum traction force in vehicle speed-traction force characteristics in cases in which the pump displacement rapid change suppression control is not performed.

7. The construction vehicle according to claim 1, further comprising
a selector configured and arranged to allow an operator to select implementation of the pump displacement rapid change suppression control.

8. A construction vehicle comprising:
an engine;
a travel hydraulic pump driven by the engine;
a travel hydraulic circuit through which pressure oil discharged from the travel hydraulic pump flows;
a travel hydraulic motor driven by the pressure oil supplied through the travel hydraulic circuit;
a travel wheel driven by drive force of the travel hydraulic motor;
a work equipment hydraulic pump driven by the engine;
a work equipment driven by pressure oil discharged from the work equipment hydraulic pump;
a controller configured to control an engine speed, displacement of the travel hydraulic pump, and displacement of the travel hydraulic motor so as to control a vehicle speed and traction force; and
an oil pressure limiting component configured to limit travel circuit pressure so as not to exceed a predetermined cutoff pressure value, the travel circuit pressure corresponding to pressure of pressure oil flowing through the travel hydraulic circuit;
the controller being configured to implement a pump displacement rapid change suppression control for controlling the displacement of the travel hydraulic pump so that the displacement of the travel hydraulic pump gradually decreases as the travel circuit pressure increases, and the travel circuit pressure reaches a maximum value equal to or less than the cutoff pressure value when the vehicle has stopped regardless of the engine speed.

9. The construction vehicle according to claim 8, further comprising
a travel circuit pressure detector configured and arranged to detect the travel circuit pressure, and
an engine speed detector configured and arranged to detect the engine speed,
the controller being configured to control the displacement of the travel hydraulic pump during the pump displacement rapid change suppression control on the basis of the travel circuit pressure detected by the travel circuit pressure detector and the engine speed detected by the engine speed detector.

10. The construction vehicle according to claim 8, further comprising
a vehicle speed detector configured and arranged to detect vehicle speed, and
an engine speed detector configured and arranged to detect the engine speed,
the controller being configured to control the displacement of the travel hydraulic pump on the basis of the vehicle speed detected by the vehicle speed detector and the engine speed detected by the engine speed detector during the pump displacement rapid change suppression control.

11. The construction vehicle according to claim 8, further comprising
an electromagnetic proportional control valve configured and arranged to change the displacement of the travel hydraulic pump,
the controller being configured to control the displacement of the travel hydraulic pump by electrically controlling the electromagnetic proportional control valve.

12. The construction vehicle according to claim 8, further comprising
a pump displacement control mechanism configured and arranged to vary the displacement of the travel hydraulic pump in accordance with supplied pilot pressure, and
a pressure control valve configured and arranged to change the pilot pressure supplied to the pump displacement control mechanism,
the controller being configured to control the displacement of the travel hydraulic pump by electrically controlling the pressure control valve.

13. The construction vehicle according to claim 8, wherein
the controller is configured to control the displacement of the travel hydraulic pump during the pump displacement rapid change suppression control so that maximum traction force in vehicle speed-traction force characteristics occurs at a lower speed than the maximum traction force in vehicle speed-traction force characteristics in cases in which the pump displacement rapid change suppression control is not performed.

14. The construction vehicle according to claim 8, further comprising
a selector configured and arranged to allow an operator to select implementation of the pump displacement rapid change suppression control.

* * * * *